United States Patent [19]

Morris et al.

[11] 3,766,484

[45] Oct. 16, 1973

[54] DETECTION OF CYCLE SLIPPAGE BETWEEN TWO SIGNALS

[75] Inventors: Robert Charles Morris, Matawan; Orlando Napolitano, Cliffwood; Gerald Philip Pasternack, Colts Neck; Burton R. Saltzberg, Middletown, all of N.J.

[73] Assignee: Bell Telephone Laobratories, Incorporated, Murray Hill, Berkeley Heights, N.J.

[22] Filed: Sept. 18, 1972

[21] Appl. No.: 289,947

[52] U.S. Cl. ...................... 328/179, 179/15, 328/72

[51] Int. Cl. ............................................ H03k 3/53

[58] Field of Search ........................ 328/179, 63, 72, 328/201; 178/69.5; 179/15

[56] References Cited

UNITED STATES PATENTS

| | | | |
|---|---|---|---|
| 3,488,440 | 1/1970 | Logan | 178/69.5 |
| 3,042,751 | 7/1962 | Graham | 179/15 |
| 3,582,795 | 6/1971 | Heick | 328/179 |

FOREIGN PATENTS OR APPLICATIONS

| | | | |
|---|---|---|---|
| 1,148,245 | 4/1969 | England | 328/179 |

*Primary Examiner*—John W. Huckert
*Assistant Examiner*—R. E. Hart
*Attorney*—W. L. Keefauver et al.

[57] ABSTRACT

Clocking signals are recovered from an incoming signal train by a master clock oscillator phase locked to the incoming signals, and, in the event of a failure or malfunction involving the master clock, by a standby clock similarly phase locked to the incoming signals. One of the malfunctions occurs when the phase of the clock output slips a cycle with respect to the phase of the signal train. It is determined that a cycle slippage condition exists when phase comparisons of the signals indicate the clock output is passing from a phase lag error to a phase lead error, or vice versa, without passing through a region of no phase error.

6 Claims, 4 Drawing Figures

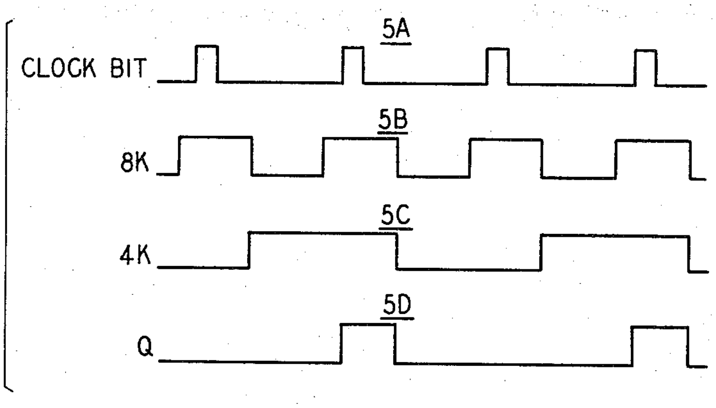
FIG. 2
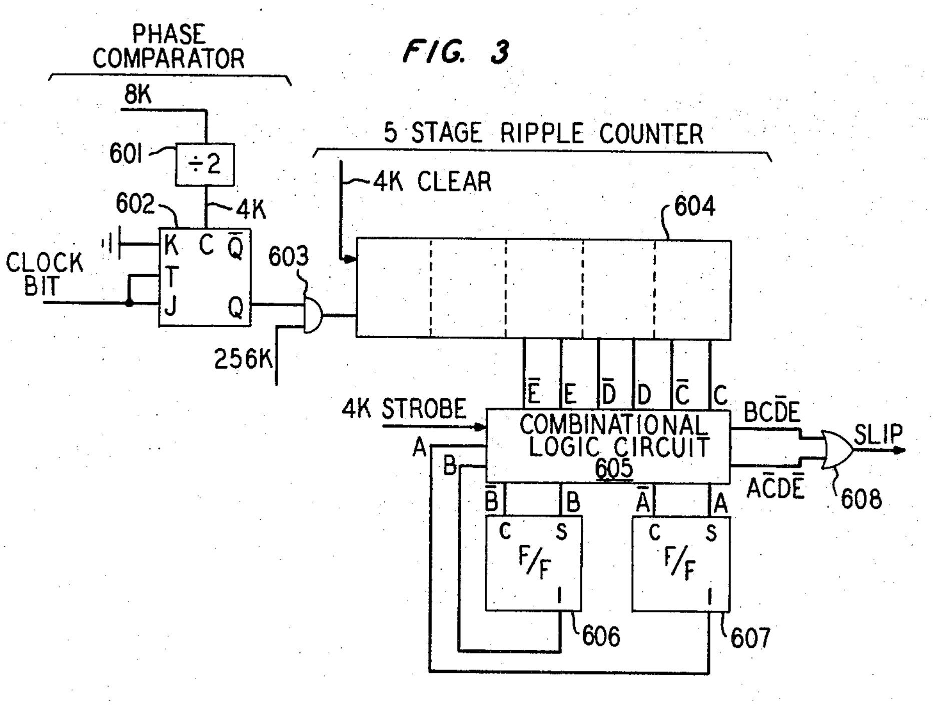
FIG. 3
FIG. 4
NEXT STATE TRANSMISSION TABLE
COMBINATIONAL LOGIC 605
| PRESENT STATE A,B \ INPUT C,D,E | 000 | 001 | 010 | 011 | 100 | 101 | 110 | 111 |
|---|---|---|---|---|---|---|---|---|
| 00 | * | * | 01 | 00 | 00 | 10 | * | * |
| 01 | 01 | 01 | 01 | 00 | 00 | <u>10</u> | 01 | 01 |
| 10 | 10 | 10 | <u>01</u> | 00 | 00 | 10 | 10 | 10 |

DETECTION OF CYCLE SLIPPAGE BETWEEN TWO SIGNALS

FIELD OF THE INVENTION

This invention relates to phase comparison circuits and, more particularly, to comparison circuits which detect discontinuities or slippage in the phase relation between two signals having approximately the same frequency.

DESCRIPTION OF THE PRIOR ART

In synchronous signaling systems, such as time-division multiplex systems, it is necessary to have a continuous and uninterrupted clocking signal to properly receive and distribute incoming signal trains. The clock signal recovery circuit preferably comprises a master clock oscillator which is phase locked to the signal train and which has sufficient stability to maintain this synchronism despite momentary outages and losses of the incoming train. In addition, a standby oscillator is provided, the standby being similarly phase locked to the incoming signal train and, consequently, in phase with the master clock. Equipment senses output failure of the master clock and, assuming no failure of the standby clock output, automatically switches over to the standby. Since the standby is in phase with the incoming train, the switching does not interrupt the reception and distribution of the incoming signals in the train.

It is also known to provide sensings which indicate malfunctions other than failure to provide output signals. One such malfunction sensing involves detection of phase error between a clock output and the signal train, the malfunction representing either an improperly operating clock or an out-of-bounds signal frequency extracted from the train. Typically, the sensing is provided by a phase comparator which compares the phases of the clock output and the signal train and indicates a malfunction when the phase error exceeds a predetermined threshold or boundary.

We have concluded that a useful performance criteria for a phase-locked clock is to operate with a phase error which does not exceed a boundary where it can be said to have slipped into the next cycle. Accordingly, it is an object of this invention to detect cycle slippage between two signals.

SUMMARY OF THE INVENTION

In accordance with this invention, the range of phase errors (up to modular $\pm\pi$) are divided into regions, one of the regions indicating that the two signals are substantially in phase, another one of the regions indicating that the clock output lags the signal train, and a further region indicating that the clock output leads the signal train. It is determined that a slip condition exists when successive phase errors pass from the phase lag region to the phase lead region or from the phase lead region to the phase lag region without passing through the substantially-in-phase region.

In the illustrative embodiment of the invention, disclosed hereinafter, the cycle slippage determination is made by a multistate sequential machine, each state corresponding to a phase error region. In general, the sequential machine comprises a combinational logic circuit and a memory circuit. The memory circuit provides the storage of the designation of the present state of the machine and the logic circuit is controlled by this present state designation and the phase error to develop the next state designation for application back to the memory circuit. Thus, when the machine is in a "phase lag" state and the phase error is within the phase lead region or when the machine is in a "phase lead" state and the phase error is within the phase lag region, the logic circuit determines that a slip has occurred.

The magnitude of the phase error is developed by a comparator comprising a source of pulses, a counter, and a phase comparator for gating the pulses to the counter, the number of gated pulses depending on the phase error. The pulse count is then applied, as a phase error indication, to the logic circuit.

The foregoing and other objects and features of this invention will be more fully understood from the following description of an illustrative embodiment thereof taken in conjunction with the accompanying drawings.

BRIEF DESCRIPTION OF THE DRAWINGS

In the drawing:

FIG. 2 discloses timing waves produced by various equipment in the clock signal recovery system;

FIG. 3 discloses, in schematic form, the details of the circuitry and equipment of one of the slip detectors; and FIG. 4 depicts a table identifying input information and output information thereby produced by the combinational logic circuit which forms part of the slip detector.

DETAILED DESCRIPTION

Figure 1:
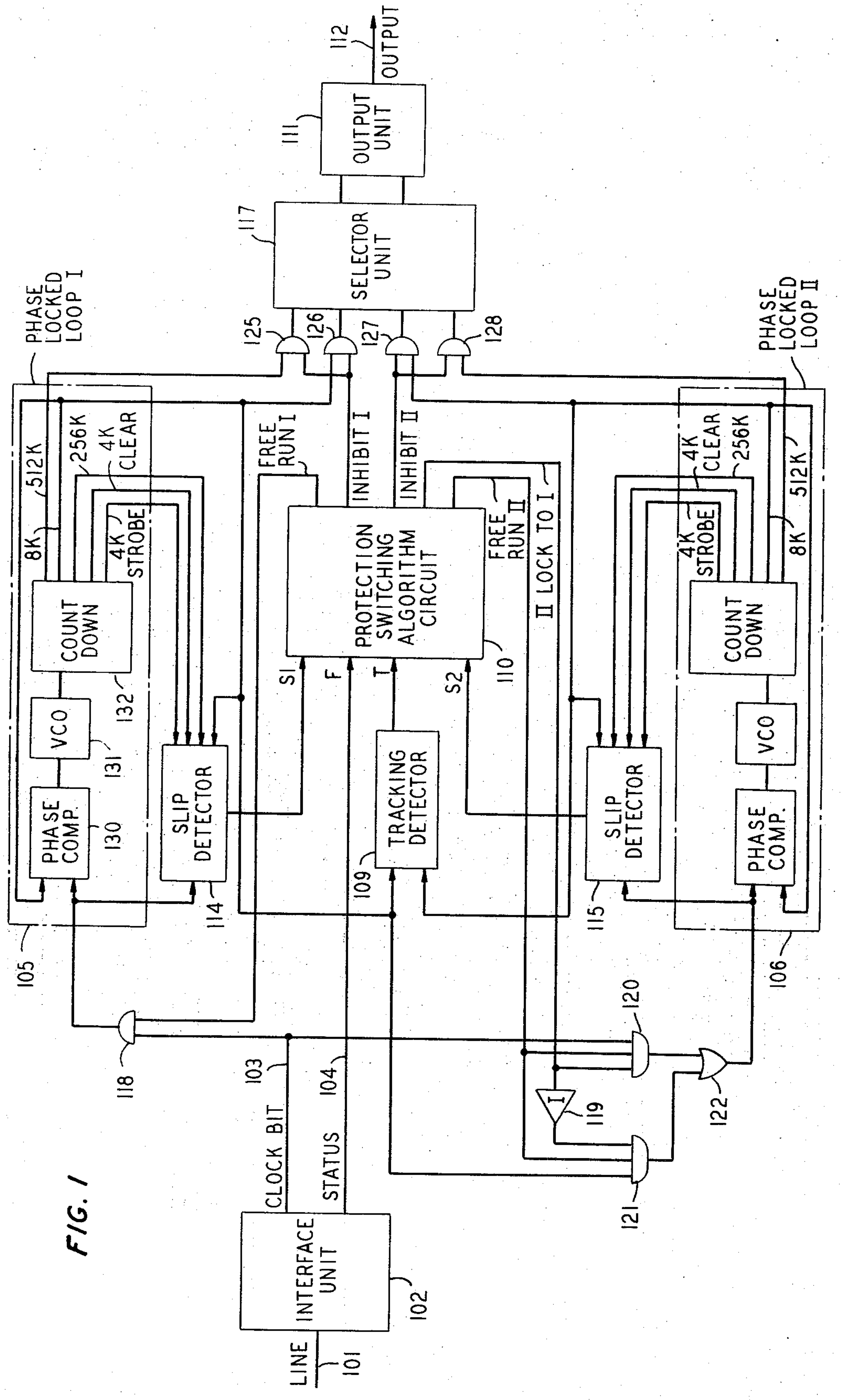
FIG. 1 shows, in block form, the manner in which slip detectors form part of a clock signal recovery system.

Slip detectors may advantageously be employed in a redundant clock recovery system, such as the system shown in FIG. 1, the slip detectors providing the function of detecting cycle slippage between each clock recovery circuit and the incoming clock signal. In general, the clock recovery system of FIG. 1 comprises a first phase-locked loop, identified as block 105, and a second phase-locked loop, identified as block 106, both loops normally being phase locked to an incoming clock bit signal. This incoming clock bit signal comprises a sequence of bits occurring at the repetition rate of eight kilobits per second (kbs), which sequence is superimposed on a high-speed bit train received over line 101. Interface unit 102 detects the clock signal bits and applies the clock bits to clock bit lead 103. The clock bit detection circuitry in interface 102 advantageously comprises circuitry of the type disclosed in FIG. 2 of the copending application of K. W. Boyd-B. R. Saltzberg-H. M. Zydney, Ser. No. 266,686, filed June 27, 1972. This resultant clock bit signal on lead 103 is depicted as timing wave 5A in FIG. 2 of this application.

Interface unit 102 also provides an enabling, or high potential, to STATUS lead 104 so long as the clock bits are being recovered from the high-speed bit train on line 101. Interface unit 102 also includes a timing circuit which times out if the clock bits are not recovered for a predetermined interval and, upon timing out, lowers the potential applied to STATUS lead 104. The signal on lead 104 is passed to input terminal F of protection switching algorithm circuit 110.

The clock bits on lead 103 are passed through normally enabled gate 118 to phase-locked loop 105 and are passed through normally enabled gate 120 and OR gate 122 to phase-locked loop 106. Phase-locked loop 105 includes phase comparator 130, voltage control oscillator 131 and countdown circuit 132. Voltage control oscillator 131 provides to countdown circuit 132 a signal wave having a frequency which is an integral multiple of 512 kiloHertz. This 512 kHz wave is divided down by countdown circuit 132 to provide five wave outputs; namely, a 512 kHz square wave, a 256 kHz square wave, an 8 kHz square wave, a strobe pulse having a 4 kbs repetition rate and a clear pulse having a 4 kbs repetition rate, the strobe pulse leading the clear pulse in phase. The 8 kHz square wave, which is depicted as timing wave 5B in FIG. 2, is fed back to one input of phase comparator 130, the other input of phase comparator 130 comprising the incoming 8 kbs clock bit signal. Phase comparator 130, therefore, provides at its output a voltage determined by the phase difference between the two waves, which voltage controls the frequency of voltage control oscillator 131. Phase comparator 130, voltage control oscillator 131 and countdown circuit 132, therefore, operate as a conventional phase-locked loop and the outputs of countdown circuit 132 are locked in phase with the incoming 8 kbs clock bit signal.

Phase-locked loop 106 is arranged in substantially the same manner as phase-locked loop 105. Phase-locked loop 106, of course, is locked in phase with the incoming 8 kbs clock bit signal being passed through OR gate 122 and provides at its outputs a 512 kHz square wave, a 256 kHz square wave, an 8 kHz square wave, a 4 kbs strobe pulse and a 4 kbs clear pulse in the same manner as the corresponding outputs are provided by phase-locked loop 105.

The 512 kHz wave and 8 kHz wave outputs of countdown circuit 132 of phase-locked loop 105 are passed to gates 125 and 126, respectively. Assuming the gates are enabled, the 512 kHz and 8 kHz waves are passed to selector unit 117.

Similarly, the 512 kHz and 8 kHz outputs of phase-locked loop 106 are passed to gates 127 and 128, respectively, and in the event that these gates are enabled, the signals are passed therethrough to selector unit 117.

Selector unit 117 comprises a gating unit which either passes the outputs of gates 125 and 126 therethrough or passes the outputs of gates 127 and 128 therethrough. Advantageously, selector unit 117 monitors the 8 kHz wave outputs of gates 126 and 127 and normally passes the outputs of gates 125 and 126 therethrough except when the 8 kHz wave appears at the output of gate 127 and not at the output of gate 126, whereupon selector unit 117 passes the outputs of gates 127 and 128 therethrough. The outputs of selector unit 117 are passed to output unit 111, which creates a composite signal from the 512 kHz and the 8 kHz waves and passes the composite signal to output lead 112 for distribution to digital circuits, not shown, which utilize the clock signals. Suitable circuitry for output unit 111 is shown in FIG. 1 of the above-identified K. W. Boyd et al application.

The 256 kHz output wave, the 8 kHz output wave, the 4 kbs clear pulse and the 4 kbs strobe pulse, all derived from phase-locked loop 105, are applied to slip detector 114. In general, the function of slip detector 114 is to monitor the output of phase-locked loop 105 and compare this output with the incoming 8 kbs clock bit signal being passed through gate 118 to determine if there is a cycle slippage; that is, to determine if the incoming clock signal slips one cycle behind the phase-locked loop 8 kHz signal or the loop 8 kHz signal slips one cycle behind one incoming 8 kbs clock signal. As described in detail hereinafter, the output of slip detector 114 is normally low and the output goes high if there is a cycle slippage. This output is passed to the $S_1$ input terminal of protection switching algorithm circuit 110.

The 256 kHz and 8 kHz waves and the 4 kbs clear and strobe pulses of phase-locked loop 106 are applied to slip detector 115, which also monitors the 8 kbs clock bit signal passed through OR gate 122 to determine whether a slip occurs between the incoming 8 kbs clock bit signal and the output of phase-locked loop 106. The output of slip detector 115 is normally low and goes high in the event that a cycle slippage occurs. This output is applied to the $S_2$ input terminal of protection switching algorithm circuit 110.

The 8 kHz square wave outputs of phase-locked loop 105 and phase-locked loop 106 are also applied to tracking detector 109. Tracking detector 109 comprises a conventional phase comparator and determines the difference in phase between the outputs of phase-locked loops 105 and 106. If the difference in phase between the two loops exceeds a predetermined threshold, the normally high output of tracking detector 109 goes low. This output is applied to input terminal T of protection switching algorithm circuit 110.

Protection switching algorithm circuit 110 is arranged to operate as a sequential machine. As previously described, four input terminals; namely, terminals F, $S_1$, $S_2$ and T are provided for the circuit. The information on these terminals advises protection switching algorithm circuit 110 whether the incoming clock bits are being received, whether a slip has occurred between the input and output of either one of the phase-locked loops, and whether or not the outputs of the phase-locked loops are tracking each other. In general, protection switching algorithm circuit 110 cycles through various states in response to various successive permutations of conditions applied to the input terminals and, in the several states, provides various functions, alternatively and in combination, the major functions comprising phase locking the loops to the incoming clock bit signal, permitting the loops to free run, and phase locking one loop to the output of the other loop. In addition, protection switching algorithm circuit 110 has the capability of inhibiting the output of one or the other of the loops. A protection switching algorithm circuit arranged to cycle through various states and to provide various functions, as described above, is disclosed in detail in the copending application of O. Napolitano G. P. Pasternack-B. R. Saltzberg (Case 1-9-17), filed concurrently herewith.

To provide the several functions, protection switching algorithm circuit 110 has five output leads. The output lead identified as FREE RUN I extends to gate 118. When protection switching algorithm circuit 110 lowers the potential on lead FREE RUN I, gate 118 is disabled, blocking the passage of the clock bit signals therethrough, where-upon phase-locked loop 105 free runs. When protection switching algorithm circuit 110 lowers the potential on output lead FREE RUN II, gate 120 is disabled, blocking the passage of the clock bit signal therethrough. At the same time, gate 121 is disabled. As a consequence, no signal wave can pass through OR gate 122 and phase-locked loop 106 runs free.

When protection switching algorithm circuit 110 drops the potential on lead INHIBIT I, normally enabled gates 125 and 126 are disabled. Accordingly, the previously described outputs of phase-locked loop 105 which extend to selector unit 117 are blocked by gates 125 and 126. Conversely, if protection switching algorithm circuit 110 drops the potential on lead INHIBIT II, normally enabled gates 127 and 128 are disabled. The previously described outputs of phase-locked loop 106, which extend to selector unit 117, are blocked by gates 127 and 128.

In the normal state of protection switching algorithm circuit 110, a high potential is applied to output lead II LOCK TO I. This enables gate 120 and disables gate 121 by way of inverter 119 (presuming that protection switching algorithm circuit 110 is also applying a high potential to output lead FREE RUN II). With gate 120 enabled, the clock bit signal on lead 103 is passed through the gate and through OR gate 122, locking phase-locked loop 106 to the incoming clock signal. If protection switching algorithm circuit 110 lowers the potential on output lead II LOCK TO I, gate 120 is disabled and gate 121 is enabled by way of inverter 119. The 8 kHz square wave output of phase-locked loop 105 is thereupon passed through gate 121 and OR gate 122 to phase-locked loop 106. Phase-locked loop 106 is therefore locked to the output of phase-locked loop 105.

The details of a slip detector such as detector 114 (or detector 115, which is arranged in substantially the same manner as slip detector 114) are shown in FIG. 3. In general, the slip detector comprises a phase comparator, consisting of divide-by-two counter 601 and flip-flop 602, five-stage ripple counter 604 and a sequential machine, consisting of combinational logic circuit 605 and memory flip-flops 606 and 607. The phase comparator compares the 8 kHz square wave output of the phase-locked loop with the incoming clock bit signal, developing an output wave pulse whose width is controlled by the difference in phase between the two input waves. This pulse width controls the number of high frequency pulses which are applied to counter 604. Counter 604 counts the pulses, the pulse number count indicating whether (1) the angle of phase error is sufficiently small so as to exist in a region wherein the loop is considered to be in substantial phase lock; (2) the phase of the loop leads the phase of the incoming clock bit signal by an angle outside the region of substantial phase lock but less than an excessive angle such as 90°; (3) the phase of the loop lags the phase of the incoming clock bit signal by an angle outside the region of substantial phase lock but less than an excessive angle such as 90°; (4) the phase error angle is greater than an excessive angle such as 90°. It is the general function of the sequential machine, consisting of logic circuit 605 and flip-flops 606 and 607, to read the pulse number counts, to proceed to machine "states" in accordance with the count readings and to designate that a cycle slip has occurred when the phase error angle passes from the phase lag to the phase lead regions or from the phase lead to the phase lag regions without passing through the region of substantial phase lock.

The incoming clock bit signal passed through gate 118 is applied to the TOGGLE and J input terminals of flip-flop 602. The K input terminal of flip-flop 602 is tied to ground. The CLEAR input of the flip-flop is connected to the output of divide-by-two counter 601; the input of divide-by-two counter 601 being connected to the 8 kHz square wave output of the phase-locked loop. Divide-by-two counter 601, therefore, provides a 4 kHz square wave, depicted as timing wave 5C in FIG. 2. Flip-flop 602 is maintained in the CLEAR condition so long as the potential of the 4 kHz square wave is low. When the 4 kHz square wave potential is high, however, flip-flop 602 is toggled to the SET condition by the positive-going transition of the clock bit signal.

When flip-flop 602 is in the CLEAR condition, the potential on output terminal Q is low. Conversely, when flip-flop 602 is in the SET condition, the potential on output terminal Q is high. Accordingly, the output wave on terminal Q comprises a pulse rising in potential when the leading edge of the clock bit pulse is applied to the flip-flop (and the potential of the 4 kHz wave is high) and falling in potential when the 4 kHz wave potential goes low, as shown in Q timing wave 5D in FIG. 2. It is apparent that when the 8 kHz square wave output of the loop is exactly in phase with the clock bit signal, the width of the pulse on terminal Q is the same as the width of the 8 kHz square wave pulse.

In the timing waves shown in FIG. 2 the phase of the 8 kHz square wave 5B is slightly leading the phase of the clock bit wave 5A. The 4 kHz square wave 5C is, of course, aligned with the 8 kHz square wave. As a consequence, the pulse width of the wave at output terminal Q is somewhat smaller than the 8 kHz square wave pulse. With the loop leading in phase, the maximum possible phase error would result in a pulse of negligible width. Similarly, if the 8 kHz square wave of the output of the phase-locked loop lags the clock bit signal, the pulse width on output terminal Q would exceed the width of the 8 kHz square wave pulse. With the loop lagging in phase, the maximum possible phase error would result in a pulse having almost the same width as the 4 kHz square wave pulse.

Wave 5D at output terminal Q is applied to gate 603, enabling the gate during the relatively positive pulse interval produced at the terminal. The other input to gate 603 extends to the 256 kHz square wave output of the phase-locked loop. Since the maximum pulse width is the same as the width of the 4 kHz square wave pulse, gate 603 passes a plurality of the 256 kHz square wave pulses up to a maximum of 32 pulses, the specific number of pulses depending upon the width of the pulse at terminal Q and the width of the pulse depending, in turn, on whether the loop signal lags or leads and the lag or lead phase angle.

The pulses passed through gate 602 are counted by five-stage counter 604, the counter being periodically reset by the 4 kbs clear pulse output of the phase-locked loop. The three most significant digits of the counts in counter 604 are indicated on output lead pairs C$\overline{C}$, D$\overline{D}$ and E$\overline{E}$. These output lead pairs are passed to combinational logic circuit 605.

It is recalled that the width of the pulse of Q timing wave 5D is approximately equal to the width of the 8 kHz square wave output of phase-locked loop 105 when the loop is substantially locked to the incoming clock signal. Under this condition, the count in counter

604 should constitute approximately one-half the total count of 32. This region of substantial phase lock is arranged to be from the count of 12 to the count of 19. The three most significant digits in the counter output are 011 for the counts of 12 through 15 and are 100 for the counts of 16 through 19. The counts for the "phase lead region" are arranged to be from eight to 11, for example, and the three most significant digits in counter 604 output are 010. The counts for the "phase lag region" of the phase-locked loop are arranged to be from 20 to 23 and the three most significant digits developed thereby in counter 604 are 101. A leading phase error beyond the phase lead region produces counts of zero through seven, the most significant digits being 000 or 001 and a lagging phase error beyond the phase lag region produces counts from 24 through 31 and the most significant digits are 110 or 111.

It is a function of the sequential machine to first determine the phase region of the loop, to then determine if the loop goes from the phase lead region to the phase lag region or from the lag region to the lead region without proceeding through the region of substantial phase lock. If this latter situation occurs, the sequential machine presumes that the loop proceeded from the phase lead or lag region in one cycle, through 180° phase error, to another cycle and that a slip has therefore occurred.

The function of providing the logic for determining a phase slip is provided by combinational logic circuit 605. Combinational logic circuit 605 comprises static logic circuits arranged to respond to the permutations of input conditions provided by counter 604, together with the present state conditions provided by the outputs of flip-flops 606 and 607 to develop the next state outputs on output lead pairs AA and BB of combinational logic circuit 605. The summary of the various possible input permutations from counter 604 together with the present state input conditions at the outputs of flip-flops 606 and 607 are defined in the Next State Transmission Table, shown in FIG. 4. In the Table, each horizontal row defines one of the several present states (input leads A and B) of combinational logic circuit 605 and each vertical column defines one permutation of the most significant digit outputs (C, D and E) of counter 604. The intersection of each row and column defines "next state" which constitutes the permutation of output conditions on output lead pairs $A\bar{A}$ and $B\bar{B}$ of combinational logic circuit 605 when the input conditions conform to that row and column. This "next state" output is stored in flip-flops 606 and 607 which, in turn, present the "state" to combinational logic circuit 605 on input leads A and B.

It is recalled that the counter output is 011 or 100 when the phase-locked loop is in the substantial lock region. As seen in the Next State Transmission Table for combinational logic 605, the logic circuit always presents the next state of 00 at its outputs when the counter output is 011 or 100 and "1" bits are applied by combinational logic circuit 605 to output leads $\bar{A}$ and $\bar{B}$, clearing flip-flop 606 and flip-flop 607. The flip-flops, in the CLEAR condition, store this next state, presenting the state (00) on input leads A and B to combinational logic circuit 605.

Assume now that the sequential machine is in state 00 and that the phase of the loop leads by an angle which stores a number in counter 604 having the most significant digits of 010. As seen in the Next State Transmission Table, the intersection of row 00 and column 010 defines that the next state comprises the state 01. A "1" bit is provided to output lead B of logic circuit 605, setting flip-flop 606. The potential on the output terminal of flip-flop 606 rises, whereby the conditions on input leads A and B of combinational logic circuit 605 define the next state 01. Similarly, if the phase of the loop should lag, the most significant digit output of counter 604 is 101 and the next state as defined by the intersection of row 00 and column 101 is 10. Flip-flop 607 is set and the next state 10 is presented to input leads A and B of combinational logic circuit 605. The asterisks along the row of present state 00 define count situations that cannot occur, since the slow drift of the phase of the phase-locked loop must pass through the phase lead region (count 010) or the phase lag region (count 101) when starting from the substantial lock region.

Assume now that combinational logic circuit 605 is in state 01. As seen along row 01 in the Next State Transmission Table of FIG. 4, the sequential machine will return to the next state 00 if the counter provides the most significant digit count of 011 or 100 and will remain in the state 01 for all other counts, with the exception of the counts having the most significant digits 101. In this latter event, the sequential machine proceeds to next state 10, as seen at the intersection of row 01 and column 101. In addition, the sequential machine presumes that the loop has advanced (slipped) a cycle, indicated by the next state 10 designation being underlined in the Next State Transmission Table.

Combinational logic circuit 605 includes a network of static logic elements, strobed by the 4 kHz strobe pulse output of phase-locked loop 105, which network of elements provides an output pulse designating that a slip has occurred when the input conditions satisfy the algebraic condition of $BC\bar{D}E$, the pulse being provided to the output lead designated by the corresponding algebraic expression. This pulse is passed through OR gate 608 to the output lead SLIP, which constitutes the output of the slip detector. As previously described, the output lead of the slip detector is connected to an input terminal, such as input terminal $S_1$, of protection switching algorithm circuit 110.

If the sequential machine is in state 10, it returns to the next state 00 if the counter provides the most significant digit count of 011 or 100. For all other counts the sequential machine remains in state 10, with the exception of the counts having the most significant digits of 010. In this event, the sequential machine proceeds to next state 01, as seen at the intersection of row 10 and column 010. In addition, the sequential machine presumes that the loop has slipped a cycle, indicated by the next state 01 designation being underlined in the Next State Transmission Table. With the input conditions to combinational logic circuit 605 satisfying the algebraic expression $A\bar{C}\bar{D}\bar{E}$, a pulse is provided to the output lead designated by the corresponding algebraic expression in response to the 4 kHz strobe pulse from the phase-locked loop. This pulse is passed through OR gate 608 to output lead SLIP and is passed on to input terminal $S_1$ of protection switching algorithm circuit 110.

Although a specific embodiment of this invention has been shown and described, it will be understood that various modifications may be made without departing from the spirit of this invention.

We claim:

1. A circuit for detecting cycle slippage between two signals having approximately the same frequency comprising:

comparing means responsive to the two signals for indicating when the two signals are substantially in phase, for indicating when one of the signals lags the other signal in phase and for indicating when the one signal leads the other signal in phase, and sequential logic means responsive to the comparing means for determining that the comparing means sequentially provided one and the other of the two indications that the one signal lags in phase and that the one signal leads in phase without providing an intervening indication that the signals are substantially in phase, wherein the sequential logic means has a plurality of states and includes digital logic means and memory means, the memory means being responsive to the digital logic means for storing therein a designation of a present state of the sequential logic means and the digital logic means being jointly responsive to the comparing means indication and the memory means present state designation for applying to the memory means a designation of a next state of the sequential logic means.

2. A circuit for detecting cycle slippage, as in claim 1, wherein the digital logic means is responsive to the comparing means indication that the one signal lags in phase for applying to the memory means a designation of a predetermined next one of the states and wherein the digital logic means further includes means jointly responsive to the memory means predetermined state designation and the comparing means indication that the one signal leads in phase for determining that a cycle slippage has occurred.

3. A circuit for detecting cycle slippage, as in claim 1, wherein the digital logic means is responsive to the comparing means indication that the one signal leads in phase for applying to the memory means a designation of a predetermined next one of the states and wherein the digital logic means further includes means jointly responsive to the memory means predetermined state designation and the comparing means indication that the one signal lags in phase for determining that a cycle slippage has occurred.

4. A circuit for detecting cycle slippage, as in claim 1, wherein the comparing means includes means for generating pulses, means for counting pulses, means responsive to the two signals for gating to the counting means the generated pulses and means for applying the generated pulse count to the digital logic means.

5. A circuit for detecting cycle slippage between two signals comprising:

comparing means responsive to the two signals for indicating the magnitude of the phase difference between the two signals, first digital logic means responsive to the comparing means indication for designating in a memory means that the magnitude of the phase difference is less than a fixed threshold, that one of the signals lags the other signal in phase by a magnitude more than the fixed threshold and less than a predetermined greater magnitude, and that the one signal leads the other signal in phase by a magnitude more than the fixed threshold and less than the predetermined greater magnitude, and further digital logic means jointly responsive to the memory means designation that the one signal lags in phase and the comparing means indication that the one signal leads in phase and jointly responsive to the memory means designation that the one signal leads in phase and the comparing means indication that the one signal lags in phase for determining that a cycle slippage has occurred.

6. A circuit for detecting cycle slippage, as in claim 5, wherein the first digital logic means is jointly responsive to the memory means designation and a comparing means indication that the magnitude of the phase difference is more than the predetermined magnitude for redesignating in the memory means the memory means designation.

* * * * *